United States Patent
Haenel et al.

(10) Patent No.: US 9,869,262 B2
(45) Date of Patent: Jan. 16, 2018

(54) SYSTEM AND PROCESS FOR PREDICTING AND PREVENTING PRE-IGNITION

(71) Applicant: FEV North America Inc., Auburn Hills, MI (US)

(72) Inventors: Patrick Haenel, Rochester, MI (US); Henning Kleeberg, Orion Township, MI (US); Dean Tomazic, Orion Township, MI (US)

(73) Assignee: FEV North America, Inc., Auburn Hills, MI (US)

( * ) Notice: Subject to any disclaimer, the term of this patent is extended or adjusted under 35 U.S.C. 154(b) by 367 days.

(21) Appl. No.: 14/599,719

(22) Filed: Jan. 19, 2015

(65) Prior Publication Data

US 2016/0208723 A1     Jul. 21, 2016

(51) Int. Cl.
| | |
|---|---|
| *F02D 35/02* | (2006.01) |
| *F02D 41/14* | (2006.01) |
| *F02D 41/00* | (2006.01) |
| *F02P 5/152* | (2006.01) |
| *F02D 41/40* | (2006.01) |

(52) U.S. Cl.
CPC ....... *F02D 41/1459* (2013.01); *F02D 41/008* (2013.01); *F02D 41/0085* (2013.01); *F02D 41/1441* (2013.01); *F02D 35/02* (2013.01); *F02D 41/0007* (2013.01); *F02D 41/401* (2013.01); *F02P 5/152* (2013.01); *Y02T 10/148* (2013.01)

(58) Field of Classification Search
CPC ............... F02D 41/1459; F02D 41/008; F02D 41/0085; F02D 41/1441; F02D 41/1443; F02D 41/1444; F02D 41/1445; F02D 41/1454
USPC ....................................................... 123/673
See application file for complete search history.

(56) References Cited

U.S. PATENT DOCUMENTS

| | | | |
|---|---|---|---|
| 8,447,502 B2 | 5/2013 | Rollinger et al. | |
| 8,463,533 B2 | 6/2013 | Glugla et al. | |
| 8,720,416 B2 | 5/2014 | Amann et al. | |
| 2005/0056254 A1 | 3/2005 | Wozniak et al. | |
| 2012/0048216 A1 | 3/2012 | Tomazic et al. | |
| 2013/0139786 A1 | 6/2013 | Glugla et al. | |

(Continued)

FOREIGN PATENT DOCUMENTS

JP     2011047281 A   *   3/2011

*Primary Examiner* — Mahmoud Gimie
(74) *Attorney, Agent, or Firm* — Dinsmore & Shohl LLP

(57) ABSTRACT

A process and a system for preventing pre-ignition in an internal combustion engine (ICE). The process includes providing an ICE that has a combustion chamber and an exhaust. Also provided is a total hydro-carbon (THC) sensor in communication with the combustion chamber. The THC sensor senses a THC level of the combusted gas for a given combustion cycle i ($THC_i$) of the ICE. In the event that $THC_i$ is greater than a reference THC level ($THC_{ref}$), a pre-ignition countermeasure prior to an immediate subsequent combustion cycle i+1 is executed. Furthermore, the executed pre-ignition countermeasure prevents pre-ignition from occurring in the immediate subsequent combustion cycle i+1 of the ICE.

15 Claims, 4 Drawing Sheets

(56) References Cited

U.S. PATENT DOCUMENTS

2015/0361914 A1* 12/2015 Oka .................... F02D 13/0242
123/90.15
2016/0146126 A1* 5/2016 Glugla .................... F02D 13/06
701/103

* cited by examiner

SYSTEM AND PROCESS FOR PREDICTING AND PREVENTING PRE-IGNITION

FIELD OF THE INVENTION

The present invention is related to a system and process for predicting and preventing pre-ignition in an internal combustion engine, and in particular preventing pre-ignition in an internal combustion engine using one or more hydrocarbon levels from a combustion chamber of the internal combustion engine.

BACKGROUND OF THE INVENTION

The need for motor vehicles with improved fuel economy is known. As such, downsized engines with superchargers are currently being developed to provide improved fuel economy while maintaining customer-desired engine performance. Such downsized engines are also known to have relatively high pressures at low speeds with low speed pre-ignition (LSPI) being a problem that is currently preventing further downsizing and improved fuel economy. As such, a system and a process that predicts and prevents pre-ignition, and in particular LSPI, from occurring would be desirable.

SUMMARY OF THE INVENTION

A process and a system for preventing pre-ignition in an internal combustion engine (ICE) is provided. The process includes providing an ICE that has a combustion chamber and an exhaust. Also provided is a hydro-carbon (HC) sensor in communication with the combustion chamber. In some instances, the HC sensor is a total hydro-carbon (THC) sensor in communication with the combustion chamber. The HC sensor is operable to detect a level of one or more hydro-carbons in a fuel-air mixture combusted (hereafter 'combusted gas') within the combustion chamber. In the event that the HC sensor is a THC sensor, the THC sensor is to detect a THC level of a fuel-air mixture combusted (hereafter 'combusted gas') within the combustion chamber.

The process further includes sensing one or more HC levels of the combusted gas, also referred to as simply the 'HC level' or 'THC level' if a THC sensor is employed, for a given combustion cycle i during operation of the ICE. The HC level for the given combustion cycle i is compared to a reference HC level and in the event that the HC level for the given combustion cycle i is greater than or equal to the reference HC level, a pre-ignition countermeasure prior to an immediate subsequent combustion cycle i+1 is executed. Furthermore, the executed pre-ignition countermeasure prevents pre-ignition from occurring in the immediate subsequent combustion cycle i+1 of the ICE, and in some instances the following combustion cycle i+2, the next following combustion cycle i+3, and the like.

The HC sensor can be located in the exhaust of the ICE or, in the alternative, within the combustion chamber. In addition, the pre-ignition countermeasure can be at least one of fuel enrichment of an air-fuel mixture injected into the combustion chamber, altering timing of injecting an air-fuel mixture into the combustion chamber, altering timing of initiating a spark in the combustion chamber, altering air flow of air injected into the combustion chamber and injecting a suppressing agent/fluid that inhibits pre-ignition. In some instances, the selection of the at least one of the pre-ignition countermeasures is a function of how much greater the HC level or THC level for the given combustion cycle i is than the reference HC level or reference THC level.

The reference HC or THC level can be a pre-set HC or THC reference value, respectively, which may or may not change as a function of time. In one embodiment, the HC or THC reference value changes as a function of operating patterns for the ICE, for example as a function of driver habits of a motor vehicle containing the ICE.

It is appreciated that the ICE can have a plurality of combustion chambers and the HC or THC sensor can be a global HC or THC sensor, respectively, that is operable to measure HC or THC levels for each of the plurality of combustion chambers. Stated differently, a single HC or THC sensor measures HC or THC levels, respectively, from each of the plurality of combustion chambers. In some instances, the pre-ignition countermeasure is executed on a particular combustion chamber that the HC or THC sensor detects a HC or THC level, respectively, that is greater than or equal to the reference HC or THC level. In other instances, the pre-ignition countermeasure is executed on a sub-set of the plurality of combustion chambers that include a particular combustion chamber that the HC or THC sensor detects a HC or THC level greater than or equal to the HC or THC reference level, respectively. In still other instances, the pre-ignition countermeasure is executed on all of the plurality of combustion chambers.

The system for preventing pre-ignition in the ICE includes a fuel and.or fuel-air injection system operable to inject a fuel-air mixture into the combustion chamber and an exhaust system operable for exhaust gas from the combustion chamber to exit and flow to an outlet. The ICE also has an air flow system which provides for air to flow into the combustion chamber. The ICE can optionally include a spark initiating system that initiates one or more a sparks within each combustion chamber at a desired time.

The HC or THC sensor in communication with the combustion chamber is operable to detect a HC or THC level from the combustion chamber for at least one combustion cycle i thereof. An engine control unit (ECU) is included and in communication with the fuel-air injection system, the air flow system, and/or the spark initiating system. In addition, the ECU is operable to initiate at least one pre-ignition countermeasure before a subsequent combustion cycle i+1 when the HC or THC sensor detects an exhaust HC or THC level, respectively, in an immediately previous combustion cycle i that is greater than or equal to a pre-set HC or THC reference value, respectively. Initiation and execution of the pre-ignition countermeasure prevents pre-ignition in the combustion chamber during the subsequent combustion cycle i+1. It is appreciated that without initiation and execution of the at least one pre-ignition countermeasure, the combustion chamber exhibits a pre-ignition event. In some instances, the ICE is a downsized turbocharged or supercharger engine and the at least one pre-ignition countermeasure initiated by the ECU prevents low speed pre-ignition by the downsized engine.

DETAILED DESCRIPTION OF THE INVENTION

Figure 1:
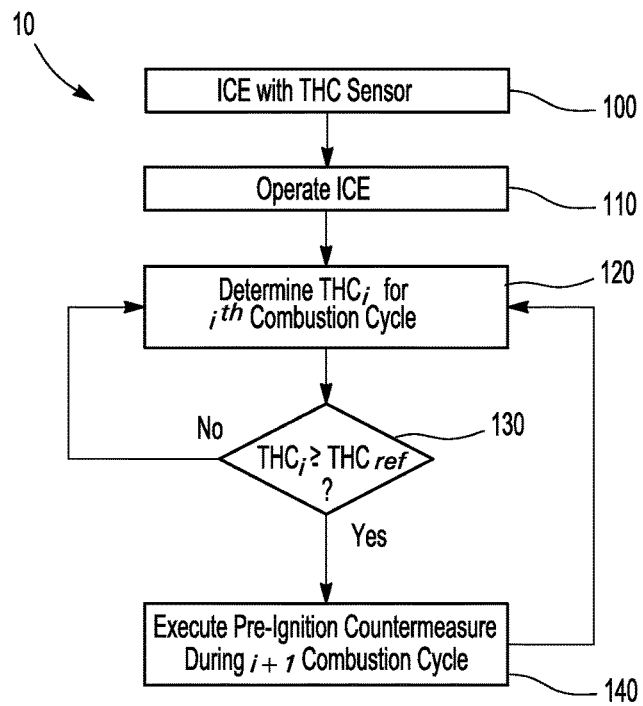
FIG. 1 is a schematic illustration of a process according to an embodiment disclosed herein.

A process and a system for preventing pre-ignition in an internal combustion engine (ICE) is provided. The process and system use a hydro-carbon (HC) sensor to determine a level of one or more HC levels of combusted gas generated in a combustion chamber of an ICE for a given combustion cycle i. In some instances, the HC sensor is a total hydrocarbon (THC) sensor that determines a THC level of combusted gas generated in a combustion chamber of the ICE for the given combustion cycle i.

The HC level or THC level for the given combustion cycle i is compared with a reference HC level ($HC_{ref}$) or reference THC level ($THC_{ref}$), respectively. If the HC level or THC level for the given combustion cycle i is greater than or equal to $HC_{ref}$ or $THC_{ref}$, respectively, a pre-ignition countermeasure is executed prior to an immediate subsequent combustion cycle i+1 and the executed pre-ignition countermeasure prevents pre-ignition from occurring in the immediate subsequent combustion cycle i+1 of the ICE. In this manner, pre-ignition is prevented before occurring instead of attempting to stop future pre-ignition events once an initial pre-ignition event has occurred as in prior art methods and systems.

The process and system both include an ICE with a combustion chamber, and in some instances a plurality of combustion chambers. The combustion chamber or the plurality of combustion chambers have an exhaust that is operable for combusted gas from the combustion chamber to flow therethrough to an outlet. A HC sensor or a THC sensor is in communication with the combustion chamber and is operable to detect the level of one or more HCs or the THC level, respectively, generated in the combustion chamber. The HC sensor or THC sensor can be in a main exhaust line, or in the alternative in a single runner of an exhaust manifold or a single exit pathway of an exhaust manifold. The HC sensor or THC sensor can also be in a combustion chamber or one of a plurality of combustion chambers. Also more than one HC sensor or THC sensor can be included and be present in a subset of runners within an exhaust manifold, all of the runners in an exhaust manifold, in a subset of a plurality of combustion chambers and/or all of a plurality of combustion chambers.

The HC sensor or THC sensor senses the HC level or THC level, respectively, from the one or more combustion chambers for a given combustion cycle i during operation of the ICE. In some instances, and in the case that the ICE has a plurality of combustion chambers, the HC sensor or THC sensor can detect HC or THC levels, respectively, for each combustion chamber. In addition, the HC or THC level for each combustion chamber and for a given combustion cycle i is compared to $HC_{ref}$ or $THC_{ref}$, respectively, and in the event that the HC or THC level is greater than or equal to $HC_{ref}$ or $THC_{ref}$, respectively, a pre-ignition countermeasure can be executed prior to an immediate subsequent combustion cycle i+1. In some instances, the pre-ignition countermeasure is executed with respect to a single combustion chamber in which a high HC level or THC level was sensed or measured. In other instances, the pre-ignition countermeasure is executed with respect to a sub-set of combustion chambers that contain a combustion chamber with a high HC or THC level. In still another alternative, the pre-ignition countermeasure is executed for all of the combustion chambers.

Any pre-ignition countermeasure that prevents pre-ignition from occurring in a given combustion chamber can be executed. Exemplary pre-ignition countermeasures include fuel enrichment of an air-fuel mixture injected into the combustion chamber, altering timing of injecting an air-fuel mixture into the combustion chamber, altering timing of initiating a spark in the combustion chamber, altering air flow of air injected into the combustion chamber and injecting a suppressing agent/fluid that inhibits pre-ignition into the combustion chamber.

The selection of one or more pre-ignition countermeasures can be a function of the sensed or measured HC or THC level. Stated differently, depending upon how much greater a sensed or measured HC or THC level is than $HC_{ref}$ or $THC_{ref}$, respectively, a particular pre-ignition countermeasure is executed, or in the alternative, more than one desired pre-ignition countermeasure is executed.

The $HC_{ref}$ or $THC_{ref}$ can be a pre-set value that does not change with time. In the alternative, the $HC_{ref}$ or $THC_{ref}$ can change as a function of time, e.g. as a function of operating patterns for the ICE.

Turning now to FIG. 1, an embodiment of a process for preventing pre-ignition in an ICE is shown generally at reference numeral 10. The process 10 includes providing an ICE with a THC sensor at step 100 and operating the ICE at step 110. The THC sensor determines the THC level for a given combustion cycle i ($THC_i$) at step 120 and a comparison of $THC_i$ with respect to a reference THC value ($THC_{ref}$) is executed at step 130. If $THC_i$ is not greater than or equal to $THC_{ref}$, the process returns back to step 120 and repeats itself. In the alternative, if $THC_i$ is determined to be greater than or equal to $THC_{ref}$ at step 130, then a pre-ignition countermeasure is executed before or during the i+1 combustion cycle at step 140. It is appreciated that execution of the pre-ignition countermeasure at step 140 prevents pre-ignition during the i+1 combustion cycle. After the execution of the pre-ignition countermeasure, the process returns back to step 120 where the THC sensor determines the THC value for subsequent combustion cycles. It is appreciated that the THC sensor can continually monitor THC levels for a combustion chamber during operation of the ICE. In addition, it is also appreciated that the THC sensor can be a HC sensor that determines $HC_i$ which is compared with $HC_{ref}$.

Figure 2:
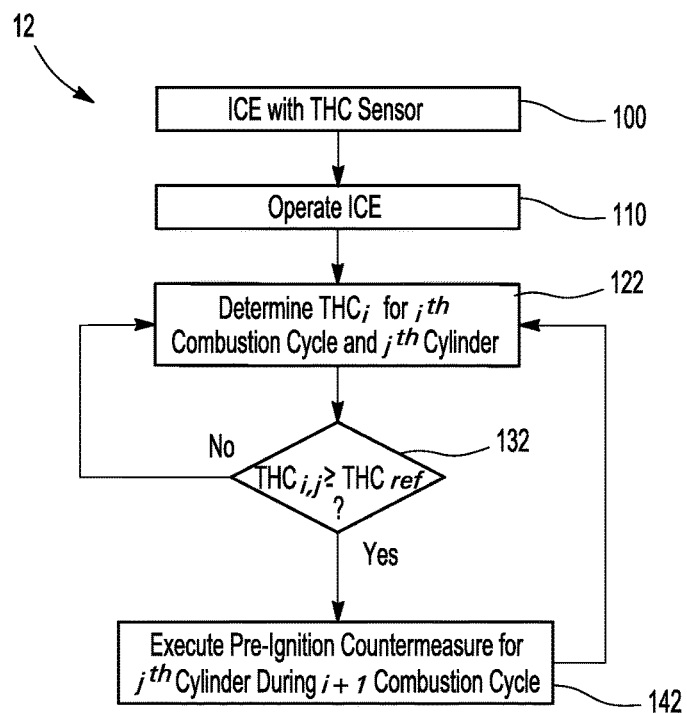
FIG. 2 is a schematic illustration of a process according to another embodiment disclosed herein.

With reference to FIG. 2, another process according to an embodiment disclosed herein is shown generally at reference numeral 12. This process includes providing the ICE with the THC sensor at step 100, however the ICE has a plurality of combustion chambers. At step 110, the ICE is operated and at step 122 the THC level for a given combustion cycle i and a given cylinder j ($THC_{i,j}$) is determined. A comparison of $THC_{i,j}$ with $THC_{ref}$ is performed at step 132. In the event that the $THC_{i,j}$ is not greater than or equal to $THC_{ref}$, the process returns to step 122. It is appreciated that the THC sensor can and does determine the THC level for each of the cylinders of the ICE during each given combustion cycle. In addition, it is also appreciated that the THC sensor can be a HC sensor that determines $HC_{i,j}$ which is compared with $HC_{ref}$.

In the event that the $THC_{i,j}$ is greater than or equal to the $THC_{ref}$, a pre-ignition countermeasure for the given cylinder j is executed before and/or during the next combustion cycle i+1 at step 142. After execution of the pre-ignition countermeasure, the process returns to step 122 where the THC sensor continues to determine THC levels for one or more cylinders in subsequent combustion cycles. The execution of the pre-ignition countermeasure for the given cylinder j prevents pre-ignition in the subsequent combustion cycle i+1, and in some instances in the following combustion cycle i+2, the next following combustion cycle i+3, and the like.

Figure 3:
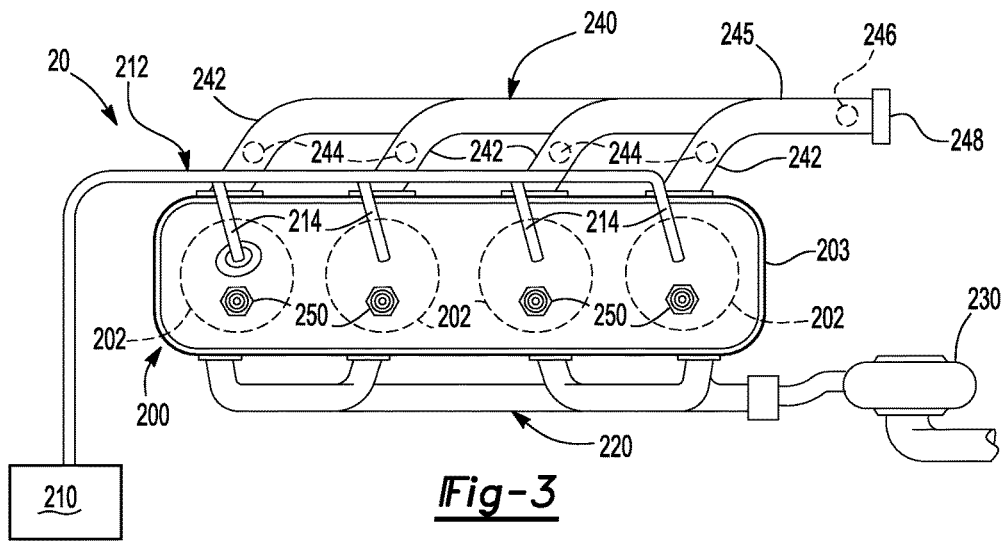
FIG. 3 is a schematic illustration of a system according to an embodiment described herein.

Regarding a system that prevents pre-ignition, FIG. 3 provides an embodiment of an ICE according to an embodiment disclosed herein at reference numeral 20. The system 20 includes a downsized ICE 200 with a plurality of cylinders 202 within a cylinder block 203. It is appreciated that pistons (not shown) slide up and down within the cylinders 202 as is known to those skilled in the art. The system 20 includes a fuel tank 210 and a fuel delivery system 212 that delivers fuel into each of the cylinders 202. The fuel delivery system 212 can be a fuel injection system with individual fuel injectors 214 that afford for the injection of fuel into the cylinders 202. In some instances, the fuel injectors 214 can be direct fuel injectors.

The system 20 also includes an air intake system 220 and optionally a supercharger or turbocharger 230. Naturally, air passing through the air intake system 220 can pass through one or more valves (not shown) into each of the cylinders 202. Furthermore, the air can be supercharged through the supercharger or turbocharger 230. The system further includes an exhaust system 240 with exhaust runners 242 from each of the cylinders 202 allowing for the passage of exhaust gas from the cylinders to a main exhaust line 245. Also, the system 20 may or may not include spark initiating devices 250, e.g. spark plugs. Stated differently, the ICE 200 can be a gasoline powered engine, an engine that uses ethanol blends, compressed natural gas (CNG), etc., or, in the alternative, a compression ignition or diesel engine.

Located on an exhaust side of the plurality of cylinders 202 is at least one THC sensor. In some instances, each of the exhaust manifolds 242 includes a THC sensor 244. However, a single THC sensor 246 can be located in or be in communication with the main exhaust line 245. In operation, air and fuel are injected into each of the cylinders 202 and combustion or burning of the air-fuel mixture results in combusted gas being generated and passing through each of the exhaust headers 242 to the main exhaust line or pipe 245 and to an outlet 248. In addition, the plurality of THC sensors 244 can monitor the THC levels in the exhaust gas from each cylinder 202 or, in the alternative, the single THC sensor 246 can monitor the THC level for each cylinder 202. In another alternative, the single THC sensor 246 measures a global or overall THC level produced from all of the cylinders 202.

Figure 5:
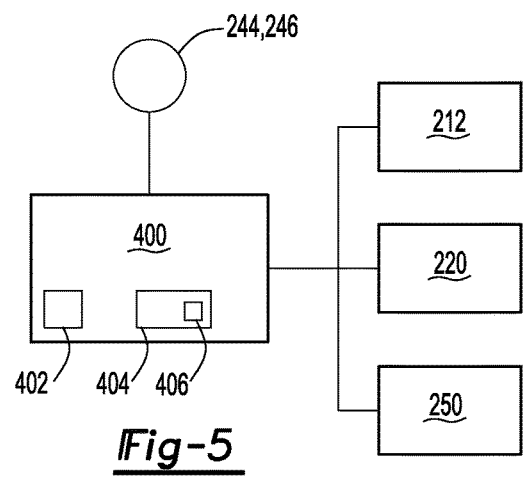
FIG. 5 is a schematic illustration of an engine control unit (ECU) in communication with a HC or THC sensor, a fuel injection system, an air flow system, and a spark initiating system.

The plurality of THC sensors 244 or the single THC sensor 246 is in communication with an engine control unit (ECU) 400 as shown in FIG. 5. The ECU 400 is also in communication with the fuel delivery system 212, the air intake system 220, and optionally the spark initiating system 250. The ECU is operable to receive a signal from one or more THC sensors and determine if a sensed or measured THC level for a given combustion cycle is greater than or equal to a stored $THC_{ref}$. In the event that one or more THC levels from the cylinders 202 for a given combustion cycle is not greater than or equal to the stored $THC_{ref}$, then no action is taken with respect to a pre-ignition countermeasure. However, if one or more of the THC sensors senses a THC level for a given combustion cycle that is greater than $THC_{ref}$, then the ECU can initiate a pre-ignition countermeasure which is executed by one or more of the fuel delivery system 212, air intake system 220, and/or spark initiating system 250. Furthermore, depending on the magnitude of the level, which particular pre-ignition countermeasure or combination of pre-ignition countermeasures that is/are initiated and executed can be selected.

Figure 4:
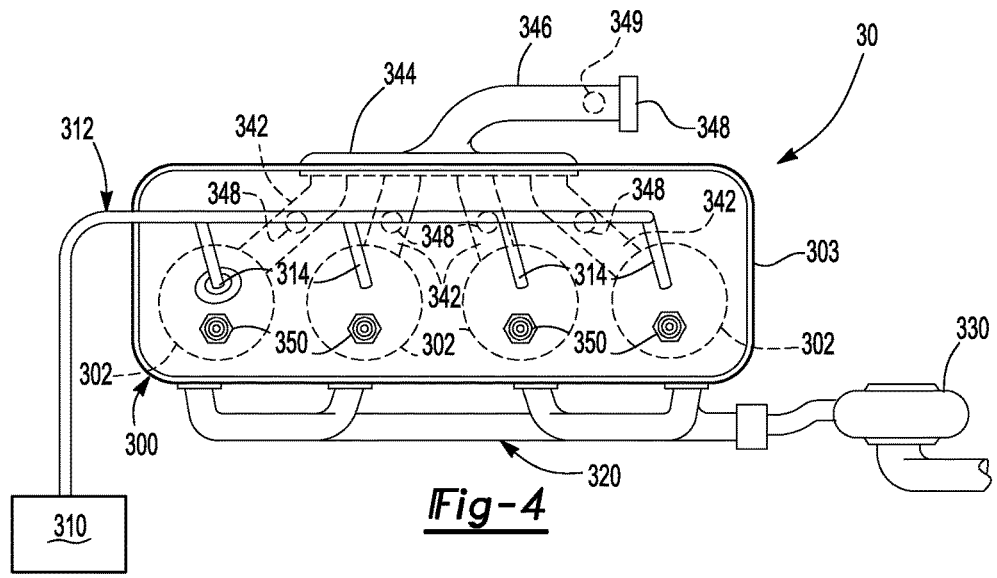
FIG. 4 is a schematic illustration of another system according to an embodiment disclosed herein.

With reference to FIG. 4, another embodiment of a system is shown at reference numeral 30. The system 30 includes a downsized ICE 300 with an air intake system 320 and a supercharger or turbocharger 330. The engine 300 includes a plurality of cylinders 302 within a cylinder block 303 as is known to those skilled in the art. The system 30 also includes a fuel tank 310 and a fuel delivery system 312 with a fuel injector 314 for each of the cylinders 302. The fuel injectors 302 may be direct fuel injectors, however this is not required. The ICE 300 has a short header system with exhaust headers 342 within the cylinder block 303. The exhaust headers 342 from each cylinder 302 lead to an exhaust manifold 344 which is in communication with a main exhaust line/pipe 346. Optional spark initiating devices 350 can be in communication with the cylinder and provide a spark during operation of the engine 300 as is known to those skilled in the art.

During operation, air passes through the supercharger or turbocharger 330, passes through the air intake system 320, and into the cylinders 302. In addition, fuel from the fuel tank 310 is delivered by the fuel delivery system 312 into the cylinders 302. A fuel-air mixture provided to each cylinder 302 is combusted, the combustion of which generates exhaust gas which passes from each cylinder 302, through the headers 342, the manifold 344, the exhaust line/pipe 346 and finally to an outlet 348.

Similar to embodiment 20 discussed above, one or more THC sensors are included. For example, a THC sensor 348 can be located in each header 342 and/or a single THC sensor 349 can be located in the exhaust manifold 346.

During operation of the system 30, it is appreciated that the THC sensors monitor THC levels in the exhaust gas from one or more of the cylinders 302. Similar to the embodiment shown in FIG. 3, the THC sensors provide THC level data to the ECU 400 illustrated in FIG. 5 and when such levels are equal to or greater than a THC reference value, the ECU can initiate one or more pre-ignition countermeasures prior to and during a subsequent combustion cycle. In addition, the fuel delivery system 312, air intake system 320 and/or spark initiating devices 350 executes one or more of the initiated pre-ignition countermeasures. It is appreciated that a pre-ignition countermeasure in the form of injection of a suppressing agent/fluid that inhibits pre-ignition can be executed. Furthermore, the ECU can include a control unit 402 and memory 404 with a software module 406 such that a learning function based on whether or not a pre-ignition event was detected and thus if a countermeasure was successful. For example and for illustrative purposes only, the ECU can be in communication with a knock sensor (not shown) and thereby can receive closed loop feedback as to if one or more countermeasures were successful, if ageing effects are present, etc. Also, the learning function can adjust a level of a given countermeasure, selection of a countermeasure and the like, based on the closed loop feedback.

In an effort to better teach the invention but not limit its scope in any way, one or more examples of an inventive process and/or system are provided below.

A 2.0 liter Ford EcoBoost test engine was used as part of a low speed pre-ignition testing program. The engine was a four-stroke turbocharged inline engine and had a firing order of 1-3-4-2. The fuel system was a direct injection fuel system with a maximum injection pressure of 200 bar. The compression ratio was 9.3 and each cylinder had two intake valves and two exhaust valves. Also, the test engine was operated with closed loop control for all boundary conditions and had cylinder pressure indications for all four cylinders with a resolution of 0.2 degree crank angle (CA).

Figure 6:
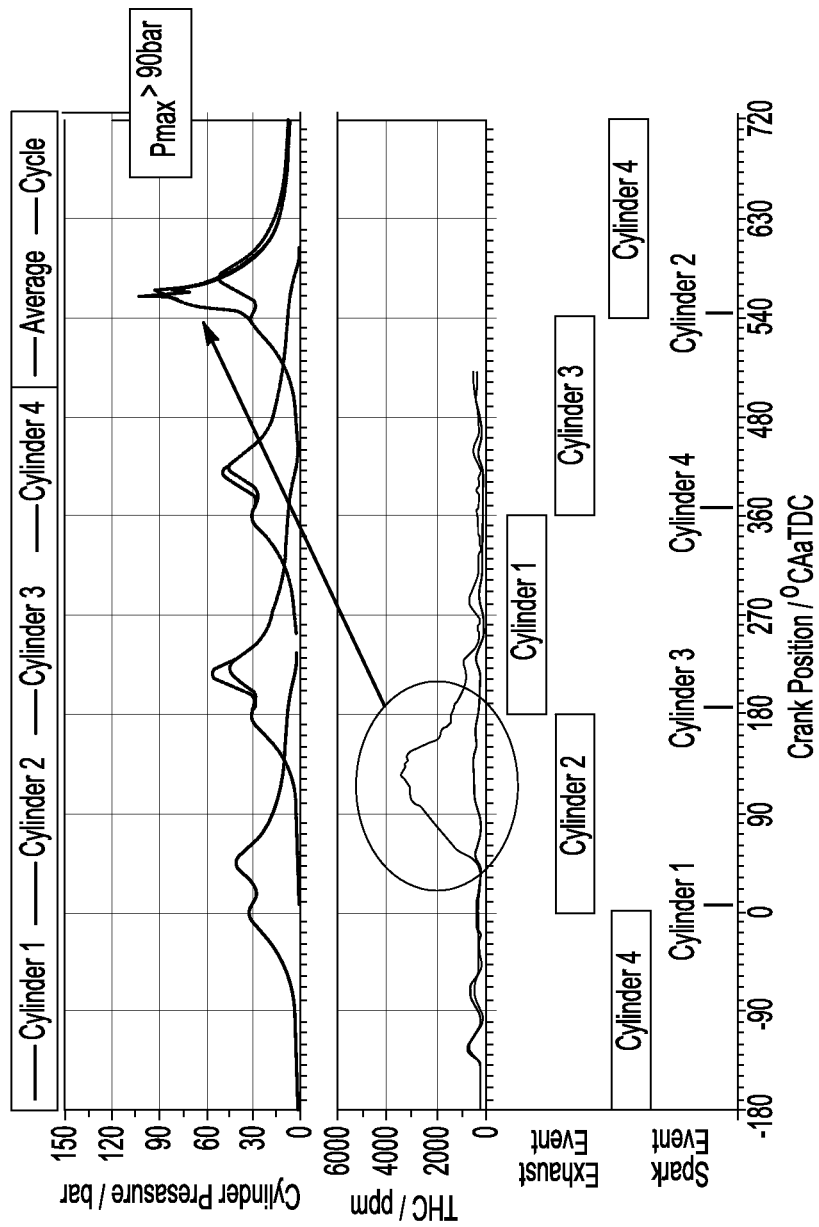
FIG. 6 is a graphical plot of spark event, exhaust event, THC level, and cylinder pressure as a function of crank position for a four cylinder internal combustion engine.

Turning now to FIG. 6, four separate graphical outputs are shown as a function of crank angle. Staring at the bottom of the y-axis and moving upward, the first and lowest graphical output is spark event for each of the cylinders. Next, exhaust event per cylinder is shown and then a measure of THC for each cylinder for a given combustion cycle i. Finally cylinder pressure for each cylinder during the next combustion cycle i+1 is shown.

As shown in FIG. 6, cylinder 2 demonstrated a relatively high THC level of approximately 3200 ppm within cylinder 2 of the given combustion cycle i. In addition, cylinder 2 exhibited a pre-ignition event with a pressure greater than 90 bar during the next subsequent combustion cycle $_i$+1.

Figure 7:
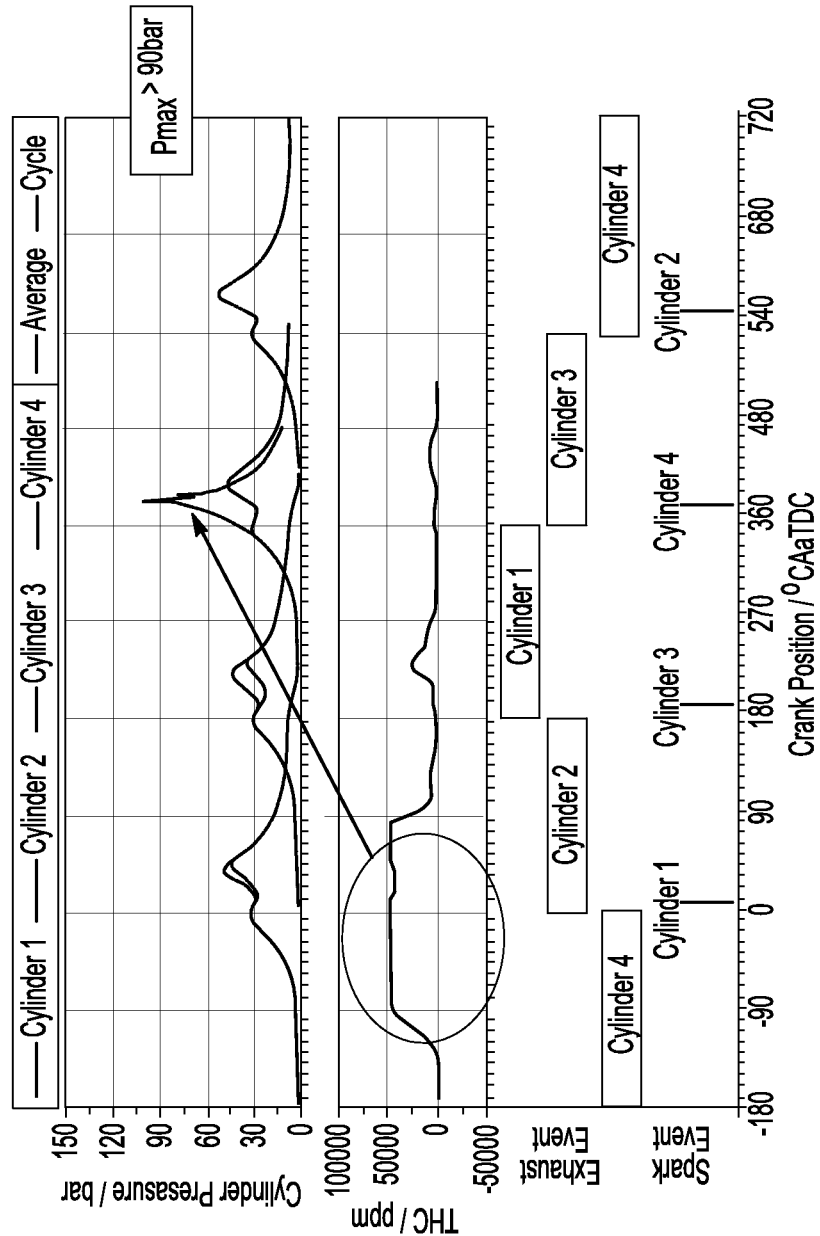
FIG. 7 is another graphical plot of spark event, exhaust event, THC level, and cylinder pressure as a function of crank position for a four cylinder internal combustion engine.

Another example of such an event is shown in FIG. 7 where a high THC level was measured in cylinder 4 for given combustion cycle i, followed by a pre-ignition event in cylinder 4 with a pressure greater than 90 bar during the next subsequent combustion cycle i+1. As such, FIGS. 6 and 7 provide evidence that a pre-ignition event in combustion cycle i+1 that can be harmful to an ICE is preceded in an immediately prior combustion cycle i with a relatively high THC level. In addition, the pre-ignition event for a particular cylinder j during a combustion cycle i+1 is preceded by the high THC level in cylinder j during the immediately preceding combustion cycle i. Therefore, the use of a THC sensor as disclosed herein can predict a pre-ignition event during the next subsequent combustion cycle i+1. Also, such a pre-ignition event is prevented by the initiation and execution of one or more pre-ignition countermeasures as discussed above.

For example and for illustrative purposes only, and with reference to FIGS. 2 and 6, an ICE with one or more THC sensors monitors THC levels for each of the engine cylinders. Upon detecting a THC level for a particular cylinder j and during a given combustion cycle i that is higher than $THC_{ref}$, a pre-ignition countermeasure is initiated and executed for or within that particular cylinder j prior to and/or during the next subsequent combustion cycle i+1. As noted above, at least one pre-ignition countermeasure such as providing a fuel enrichment of an air-fuel mixture injected into the cylinder, altering timing of injecting an air-fuel mixture injected into the cylinder, altering timing of initiating a spark in the cylinder, altering air flow of air injected into the cylinder and/or injecting a suppressing agent/fluid into the cylinder can be performed. It is appreciated that altering the air flow can include manipulation of one or more intake air valves and/or one or more exhaust air valves.

In this manner, and as disclosed herein, monitoring of THC levels within an ICE predicts future pre-ignition events which are subsequently prevented by the initiation and execution of pre-ignition countermeasures.

It is appreciated that the embodiments, examples, etc. disclosed herein are not limiting in their scope of the invention. Changes, modifications, etc. will be apparent to those skilled in the art and yet still fall within the scope of the invention. As such, it is the claims, and all equivalents thereof, that define the scope of the invention.

We claim:

1. A process for preventing pre-ignition in an internal combustion engine (ICE), the process comprising:
   providing an ICE, the ICE having a combustion chamber with an exhaust;
   providing a total hydro-carbon (THC) sensor located in the exhaust of the ICE, the THC sensor operable to detect an exhaust THC level generated in the combustion chamber;
   preventing pre-ignition of the ICE by:
      sensing a THC level from the combustion chamber for a given combustion cycle i ($THC_i$) during operation of the ICE using the THC sensor;
      comparing the $THC_i$ level for the given combustion cycle to a reference THC level ($THC_{ref}$); and
      executing a pre-ignition countermeasure prior to an immediate subsequent combustion cycle (i+1) when $THC_i$ is determined to be greater than or equal to $THC_{ref}$ ($THC_i \geq THC_{ref}$), wherein:
      the pre-ignition countermeasure is at least one of fuel enrichment of an air-fuel mixture injected into the combustion chamber, altering timing of injecting an air-fuel mixture into the combustion chamber, altering timing of initiating a spark in the combustion chamber, altering air flow of air injected into the combustion chamber and injecting a suppressing agent/fluid into the combustion chamber;
      the executed pre-ignition countermeasure prevents pre-ignition from occurring in the immediate subsequent i+1 combustion cycle of the ICE.

2. The process of claim 1, wherein the selection of at least one of the pre-ignition countermeasures is a function of how much greater $THC_i$ is than $THC_{ref}$.

3. The process of claim 2, wherein $THC_{ref}$ is a pre-set THC reference value.

4. The process of claim 3, wherein $THC_{ref}$ changes as a function of time.

5. The process of claim 4, wherein $THC_{ref}$ changes as a function of operating patterns for the ICE.

6. The process of claim 5, wherein the operating patterns are a function of driver habits for a driver operating the ICE.

7. The process of claim 1, wherein the ICE has a plurality of combustion chambers.

8. The process of claim 7, wherein the THC sensor is a global THC sensor that is operable to measure exhaust THC levels for each of the plurality of combustion chambers.

9. The process of claim 8, wherein the pre-ignition countermeasure is executed on a particular combustion chamber that the THC sensor senses a $THC_i$ level greater than $THC_{ref}$.

10. The process of claim 8, wherein the pre-ignition countermeasure is executed on a sub-set of the plurality of combustion chambers that include a particular combustion chamber that the THC sensor senses a $THC_i$ level greater than $THC_{ref}$.

11. The process of claim 8, wherein the pre-ignition countermeasure is executed on all of the plurality of combustion chambers.

12. A system for preventing pre-ignition in an internal combustion engine (ICE), said system comprising:
   an internal combustion having a combustion chamber, a fuel-air injection system operable to inject a fuel-air mixture into said combustion chamber and an exhaust system operable for exhaust gas from said combustion chamber to exit and flow to an outlet;

a total hydro-carbon (THC) sensor in communication with said combustion chamber, said THC sensor operable to detect an exhaust THC level from said combustion chamber for at least one combustion cycle thereof; and an engine control unit (ECU) in communication with said fuel-air injection system and operable to control said fuel-air injection system and initiate at least one pre-ignition countermeasure;

said ECU initiating said at least one pre-ignition countermeasure before an i+1 combustion cycle when said THC sensor detects an exhaust THC level in a previous combustion cycle i ($THC_i$) that is greater than or equal to a pre-set THC reference value ($THC_{ref}$), wherein:

said at least one pre-ignition countermeasure is at least one of fuel enrichment of an air-fuel mixture injected into said combustion chamber, altering timing of injecting an air-fuel mixture into said combustion chamber, altering air flow of air injected into the combustion chamber and injecting a suppressing agent/fluid into the combustion chamber;

said initiation of said pre-ignition countermeasure prevents pre-ignition in said combustion chamber during said i+1 combustion cycle.

13. The system of claim 12, further comprising said ICE having a spark device operable to initiate a spark into said combustion chamber and said at least one pre-ignition countermeasure includes altering timing of initiating said spark into said combustion chamber.

14. The system of claim 13, wherein said ICE has a plurality of combustion chambers and said THC sensor is in communication with said plurality of combustion chambers and is operable to detect said exhaust THC level from each combustion chamber for at least one combustion cycle of each combustion chamber.

15. The system of claim 14, wherein said ICE is a downsized engine and said at least one pre-ignition countermeasure initiated by said ECU prevents low speed pre-ignition (LSPI) by said downsized engine.

* * * * *